UNITED STATES PATENT OFFICE.

HENRY MARTYN HART, OF DENVER, COLORADO, ASSIGNEE, BY MESNE ASSIGNMENTS, FROM ALFRED NAPIER FORD, DECEASED.

ART OF MAKING OIL FABRICS.

SPECIFICATION forming part of Reissued Letters Patent No. 11,862, dated October 9, 1900.

Original No. 574,793, dated January 5, 1897. Application for reissue filed April 4, 1900. Serial No. 12,079.

*To all whom it may concern:*

Be it known that ALFRED NAPIER FORD, deceased, late a subject of the Queen of Great Britain, and a resident of London, England, did invent certain new and useful Improvements in the Art of Making Oil Fabrics; and the following is a full, clear, and exact description of the invention, such as will enable others skilled in the art to which it appertains to make and use the same.

This invention relates to an improved art, method, or process for the manufacture of table and floor coverings, carriage-linings, and other like articles, as hereinafter described.

In practicing the invention linseed or other dry oil is taken, but preferably linseed-oil, and when it is desired to hasten its drying properties it is subjected to a temperature of 350° Fahrenheit or thereabout for ten hours, more or less, and if discoloration is of importance care should be taken that it never reaches the boiling-point or a temperature which discolors and injures the oil. The oil is then combined with one or more siccatives in such proportions as, having regard to the desired result, are best calculated to endow it with rapidly-drying properties. In the oil so prepared are repeatedly immersed fibers or finely-divided stringy or disorganized particles of wool, flax, hemp, jute, cotton, silk, worsted, or other fibrous substances, taking care that the fibers be fairly loose and not woven, because in that case they would present a closed surface, as in manufactured cotton goods, muslin, or the like. After each immersion the mass of fibers under treatment is lifted from the receptacle containing the oil and allowed to drain until the surplus oil has run into said receptacle. The fibers then, with the minute particles or drops of oil adhering, are loosely spread on shelves composed of wires or wire-gauze, so that the drops of oil which adhere to each fiber can be thoroughly oxidized by the action of the air on the whole of its surface. In some cases the process is expedited by fans to circulate hot air quickly through the fibers. When the fibers are thoroughly dry after the first immersion, they are again immersed in the oil, and the above treatment repeated until the mass of fibers is thoroughly saturated and the individual fibers coated with oil. It is found after one immersion of the fibers and the drying thereof, whereby the minute particles of oxidized oil becomes localized or fixed, that during the next treatment the fresh particles of oil locate themselves on parts of the fibers between the previous drops or particles, and it is this property that is utilized to present the greatest possible surface area of the oil for the air to act upon. The said disorganized oil-coated fibers are then ground until the composition assumes a plastic and homogeneous condition, in which state it is rolled by means of ordinary spreading-rolls, heated or otherwise, traveling, preferably, at a very slow speed, onto the surface of textile fabrics of woolen, flax, hemp, cotton, silk, or any other fabric which shall be deemed suitable to receive it. Other equivalent means of applying the prepared plastic material to the surface required to be coated may be employed.

A great advantage which this method of manufacturing has over extant methods of manufacturing table and floor coverings, carriage-linings, and other like articles consists, first, in the use for coating of a perfectly-flexible material which will not crack and which gives a softer and better surface than is produced by the methods in ordinary use, and, second, in the great saving of time and labor effected by accomplishing in one process what has hitherto required many processes and a long time to mature them.

By means of the improved process the articles are made fit for use and, if need be, for exportation to hot or cold climates within a few days of their being finished, as the substance employed in their manufacture is not liable to be affected materially by heat or cold. Moreover, since the oil employed in the manufactured articles is perfectly oxidized said articles are not injuriously affected by long-continued exposure to the atmosphere.

It is recognized that the patent issued to Walton, August 4, 1874, was for the manufacture of oxidized oil, in which a sheet of woven cloth is dipped into the oil, raised therefrom, and dried, the operation being continued until the said sheet of cloth is coated with oil to the desired extent, the cloth, with the accumulated oil, being subsequently ground up together. By this process of Walton's the oil was not thoroughly oxidized by reason of the fact, among others, that the oil sinking into the meshes of woven fabric was concealed to such an extent that the air could not reach it sufficiently to produce perfect oxidation. The result was that when a fabric was manufactured by the use of this oil the previously-unoxidized particles of oil would be attacked by the air and eaten away, as it were, whereby the garment was soon rendered useless for the purpose intended. Hence nothing in the said Walton process is claimed. On the contrary, experience has proven, after a most thorough test, that the oil is perfectly oxidized by this process and that garments made therefrom are not attacked by the air or injured by exposure thereto.

Having thus described the invention, what is claimed is—

The improvement in the art of making oil fabrics consisting in loosely separating fibers or finely-divided particles of wool, flax, hemp, jute, cotton, silk, &c., repeatedly immersing the same in previously-heated oil so as to coat the separated fibers, in thoroughly oxidizing the oil adhering to the fibers after each immersion by subjecting the coated fibers to the action of air, the fibers being maintained in their loosely-separated condition during the steps of coating and oxidizing, and in grinding the coated fibers after oxidation to form a homogeneous mass, substantially as described.

In testimony whereof I have signed my name to this specification in the presence of two subscribing witnesses.

HENRY MARTYN HART.

Witnesses:

WM. FERRIS, Jr.,

W. T. VOORHEES.